United States Patent [19]

Fukushima

[11] Patent Number: 5,097,722
[45] Date of Patent: Mar. 24, 1992

[54] LIQUID VISCOUS DAMPER

[75] Inventor: Hirotaka Fukushima, Neyagawa, Japan

[73] Assignee: Kabushiki Kaisha Daikin Seisakusho, Osaka, Japan

[21] Appl. No.: 684,922

[22] PCT Filed: Aug. 20, 1990

[86] PCT No.: PCT/JP90/01056
§ 371 Date: Apr. 19, 1991
§ 102(e) Date: Apr. 19, 1991

[87] PCT Pub. No.: WO91/03665
PCT Pub. Date: Mar. 21, 1991

[30] Foreign Application Priority Data
Aug. 29, 1989 [JP] Japan .............. 1-100976[U]

[51] Int. Cl.$^5$ .............................. F16F 15/10
[52] U.S. Cl. ............................ 74/574; 74/572; 192/106.2; 192/106.1; 192/70.17; 464/68
[58] Field of Search ............. 74/572, 573 F, 574; 192/106.1, 106.2, 70.17; 464/24, 68, 65, 66

[56] References Cited
U.S. PATENT DOCUMENTS 4,351,167  9/1982  Hanke et al. .............. 464/24
4,430,064  2/1984  Lamarche ................. 192/106.2
4,775,042  10/1988  Kohno et al. ............. 192/106.1
4,976,656  12/1990  Bacher et al. ............ 464/68

FOREIGN PATENT DOCUMENTS 0147838  10/1985  Japan .
0201122  10/1985  Japan .
0622841   9/1987  Japan .

Primary Examiner—Leslie A. Braun
Assistant Examiner—Winnie Yip
Attorney, Agent, or Firm—Armstrong & Kubovcik

[57] ABSTRACT

A viscous liquid damper in which a projection (27) protruding in a notch (20) of a flange (2) is formed on a side plate body (3), so that a liquid chamber in the notch (20) is partitioned into circumferential front and rear divided-chambers (28 & 29) and a main choke (A1) is formed. In order to allow absorption of vibrations of different kinds without mutual confrontation in such a damper; a slider (23) is mated with a bottom edge of the notch (20) in such a manner as slidable in a rotation direction, the main choke (A1) is formed between the slider (23) and the projection (27), stoppers (25) able to mate with the projection (27) are formed on circumferential both ends of the slider (23), and a movable sub-choke (A2) having a flow sectional area smaller than that of the main choke (A1) is formed in the slider (23).

1 Claim, 2 Drawing Sheets

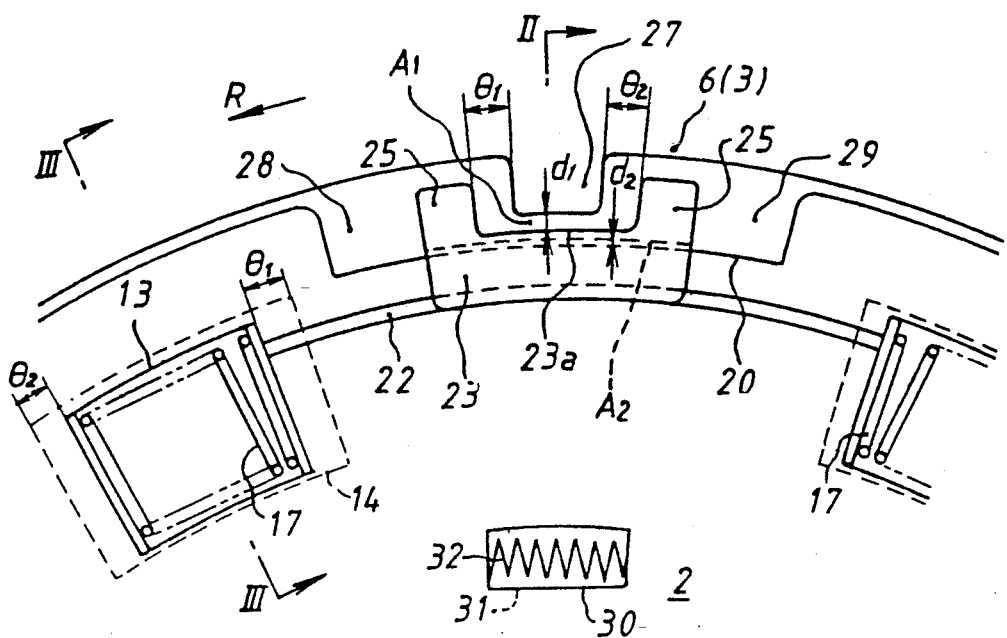
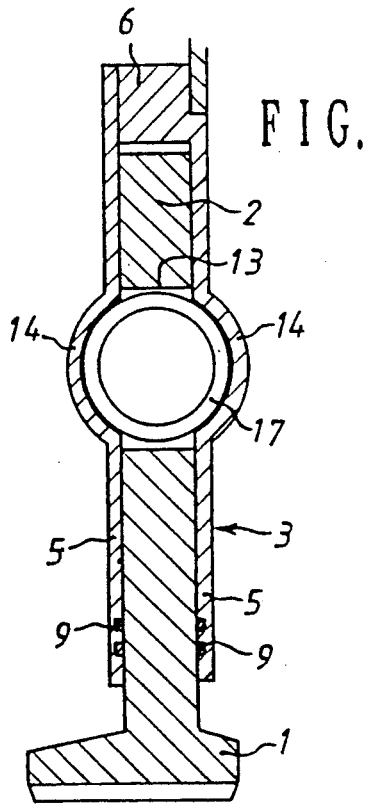
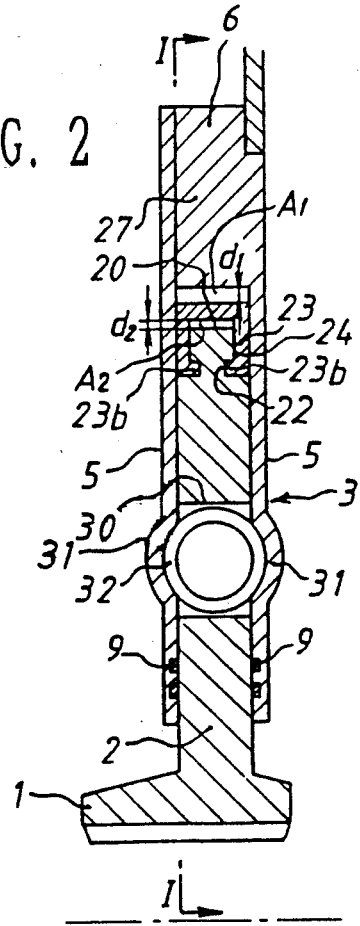

LIQUID VISCOUS DAMPER

TECHNICAL FIELD

This invention relates to a damper which is used for a torsional vibration damper coupling an engine flywheel with a transmission input shaft or for a damper disc for an automobile clutch, and especially to a liquid viscous damper which develops a hysteresis torque by means of a viscosity of liquid.

BACKGROUND ART

A damper of such type is generally equipped with a hub-side flange and a flywheel-side side plate body which houses the foregoing flange by covering both sides and outer peripheral side of the flange, and has a damper mechanism for developing a torsional torque between the flange and the side plate body. A notch 20 is formed on an outside end of the flange 2 as shown in FIG. 5, and liquid is filled in liquid chambers (28 & 29) formed by the notch 20 and an inside face of the side plate body. A projection 27, which protrudes in the liquid chambers (28 & 29) to partition the chambers into front and rear divided-chambers 28 & 29 in a rotation direction, is formed on the inside face of the side plate body 3 and a main choke A1 connecting the both divided-chambers 28 & 29 is formed.

In order to let a hysteresis torque change in two stages for example, a stepped part 60 is formed on a midway of the notch 20 so that, when the side plate body 3 is twisted relatively to the flange 2 from a state of FIG. 5 for example to a rotation direction R side by $\theta1$ or to an opposite to the ration direction R side by $\theta2$, a clearance of the choke A1 is changed from d1 to d2 and the hysteresis torque is increased from H1 to H2 as shown by FIG. 6.

However, in the event when such a structure as changing the hysteresis torque by only the torsion angle of the side plate body 3 relative to the flange 2 is employed, it becomes impossible to develop the small hysteresis torque H2 in response to circumstances in a large torsion angle range and further it becomes impossible to develop the large hysteresis torque in response to circumstances in a small torsion angle range.

OBJECT OF THE INVENTION

An object of this invention is to cope with a cycle-by-cycle variation of combustion and a vibration of car body without mutual confrontation, in such a manner as allowing a small viscous force to work when an operating angle is small arising in case of the cycle-by-cycle variation of combustion, and allowing a large viscous force to work when the operating angle is large accompanied by the vibration of car body regardless of the range of the twisting angle.

DISCLOSURE OF THE INVENTION

Technical Measure

In order to accomplish the above object, this invention provides a liquid viscous damper in which a hub-side flange and a flywheel-side side plate body housing the foregoing flange by covering both sides and outer peripheral side of the flange are installed, a damper mechanism for developing a torsional torque is installed in between the flange and the side plate body, a notch is formed on an outside end of the flange, liquid is filled in liquid chambers formed by the notch and inside faces of the side plate body, a projection protruding in the liquid chamber is formed on the inside face of the side plate body so as to partition the chamber into circumferential front and rear divided-chambers, and a main choke connecting the both divided-chambers is formed; characterized by that a slider is fitted onto a bottom edge of the notch in such a manner as slidable in a rotation direction, the main choke being formed between the slider and the projection, stoppers able to mate with the projection at circumferential both ends of the slider are formed with spaces left between them in the rotation direction, and a movable sub-choke having a smaller flow sectional area than that of the main choke is formed in the slider.

Function

Under a state where the projection does not contact with the stoppers of the slider, the liquid in the notch flows from one divided-chamber to the other divided-chamber through the main choke and the movable sub-choke when the side plate body is twisted relatively to the flange. Consequently, a resistance is small so that a small hysteresis torque is developed.

When the torsion angle is increased to cause the projection to contact with the stopper, the main choke is brought into a closed state and the slider moves together with the projection in the rotation direction, the liquid in one divided-chamber flows into the rear side divided-chamber only through the movable sub-choke. Therefore the resistance is large so that a large hysteresis torque is developed.

Even when a small angular fluctuation is produced due to the cycle-by-cycle variation of combustion, for example, under a state where the side plate body is twisted relatively to the flange at a specified angle, the projection will vibrate within a region of the both stoppers and the main choke is opened so that the small hysteresis torque can be maintained.

BRIEF DESCRIPTION OF THE DRAWINGS

FIG. 1 is a sectional view (sectional view taken on a line I—I of FIG. 2) of the liquid viscous damper to which this invention is applied, cut by a plane normal to its axis.

FIG. 2 is a sectional view taken on a line II—II of FIG. 1.

FIG. 3 is a sectional view taken on a line III—III of FIG. 1.

BEST MODE FOR CARRYING OUT THE INVENTION

Figure 4:
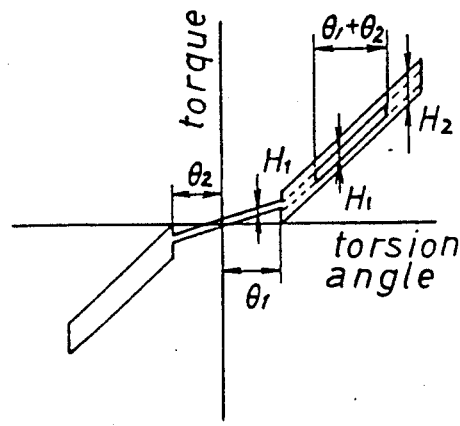
FIG. 4 is a torsion characteristic diagram in case when this invention is applied.
Figure 6:
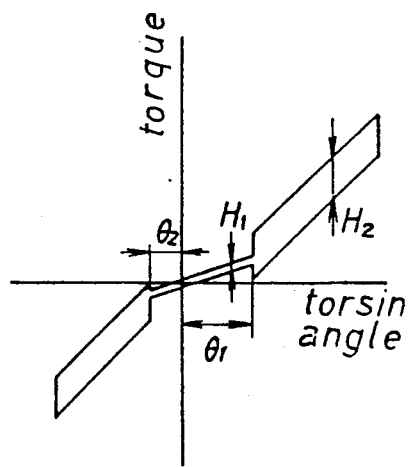
FIG. 6 is a torsion characteristic diagram of the conventional embodiment.
Figure 5:
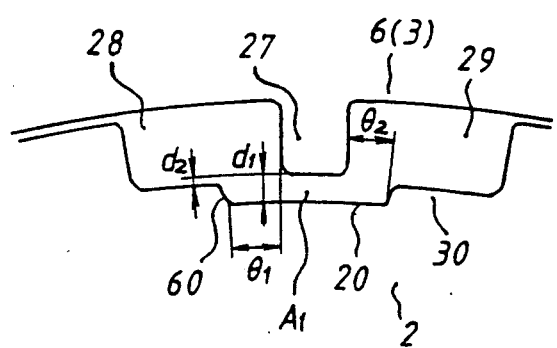
FIG. 5 is a sectional view of a conventional embodiment on the same part as FIG. 1.

In FIG. 3 showing the sectional view taken on the line III—III of FIG. 1, an output-side spline hub 1 spline fits, for example, onto a transmission input shaft and is integrally equipped with an outward-facing flange 2. A side plate body 3 is coupled to a flywheel of internal combustion engine, and is composed of side plates 5 on both sides of the flange and an outer peripheral ring 6 which covers an outside end of the flange 2. Seals 9 are installed between the both sides of the side plates 5 and the flange 2.

Plural second-stage holes 13 are made on the flange 2 with spaces left between them in a circumferential direction, second-stage concave portions 14 are made on places of the side plates 5 corresponding to the holes 13 respectively, and strong second-stage coil springs 17 are installed in the holes 13 and the concave portions 14 in such a manner as compressible in the circumferential direction.

First-stage holes 30 are made on an inner side portion of the flange 2 as shown in FIG. 2, first-stage concave portions 31 are made on places of the side plates 5 corresponding to the holes 30 respectively, and weak first-stage coil springs 32 are installed in the holes 32 and the concave portions 31 in such a manner as compressible in the circumferential direction.

In FIG. 1, a circumferential length of the second-stage concave portion 14 is longer than a circumferential length of the second-stage hole 13, so that circumferential both ends of the coil spring 17 are spaced from those of the concave portion 14 by clearances corresponding to angles $\theta_1$ and $\theta_2$, for example, when an engine is stopping. A circumferential length of the first-stage hole 30 is made equal to that of the first-stage concave portion 31.

Plural notches 20 are formed on an outer peripheral end of the flange 2 with spaces left between them in the circumferential direction, and sliders 23 are installed on a bottom edge of the notch 20 in such a way as slidable the circumferential direction. Outward-facing stoppers 25 are formed on circumferential both sides of the slider 23, and an inward-facing projection 27 protrudes from the outer peripheral ring 6 into a concave portion 23a which are formed by and made between the stoppers 25. The above-mentioned stoppers 25 & 25 are spaced from the projection 27 by distances corresponding to the angles $\theta_1$ and $\theta_2$ when the engine is stopping. The projection 27 partitions a liquid chamber inside the notch 20 into a circumferential front side first divided-chamber 28 and a circumferential rear side second divided-chamber 29, and at the same time forms a main choke A1 having a clearance d1 and connecting the both divided-chambers 28 and 29, in between the projection and a concave portion 23a of the slider 23.

A mating groove 24 spreading over a bottom edge of the notch 20 as shown in FIG. 2 is formed on a radial inside portion of the slider 23, and both-side projections 23b of the mating groove 24 mate with guide grooves 22 provided on both side faces of the flange 2. Thereby, the slider 23 is positioned in the radial direction, and a movable sub-choke A2 having a clearance of d2 is formed between the bottom edge of the notch 20 and the bottom surface of the mating groove 24. The clearance d2 of the movable choke A2 is made smaller than the clearance d1 of the main choke A1. Accordingly, a flow sectional area of the sub-choke A2 is smaller than a flow sectional area of the sub-choke A1, so that a resistance of the former is larger than that of the latter and the former can develop a larger hysteresis torque than the latter.

Function will be described hereunder. First of all, functions of the coil springs 17 & 32 at time of twisting of the damper will be described. When a torsion angle of the side plate body 3 relative to the flange 2 is small, a torsional rigidity is as small as within ranges of $\theta_1$ and $\theta_2$ of FIG. 4 for example, because the weak first-stage coil spring 32 is being compressed. On the other hand, when the torsion angle becomes large to cause the circumferential edge of the concave portion 14 of the side plate 5 of FIG. 1 to contact with the second-stage coil spring 17, the torsion rigidity becomes large because the second-stage coil spring 17 is being compressed.

Development of and change in hysteresis torque caused by the liquid in the notch 20 will be describe hereunder. Under a state where the projection 27 does not contact with the stoppers 25 of the slider 23 as shown by FIG. 1 the liquid in the notch 20 flows from the front-side divided-chamber 28 through the main choke A1 and the movable sub-choke A2 to the rear-side divided-chamber 29 when the side plate body 3 is twisted, for example, to the rotation direction R side relatively to the flange 2. Accordingly, the resistance is small so that a small hysteresis torque is developed.

When the torsion angle becomes large to cause the projection 27 to contact with the front-side stopper 25, the main choke A1 is brought into a closed state. At the same time, the slider 23 moves together with the projection 27 to the front side i.e. in the rotation direction R and the liquid in the front-side divided-chamber 28 flows to the rear-side divided-chamber 29 only through the movable sub-choke A2, so that the resistance becomes large to develop a large hysteresis torque.

When the side plate body 3 is twisted backward after being twisted forward as described in the above case, the projection 27 is separated from the front-side stopper 25 of the slider 23 immediately after beginning of the backward twisting to cause the main choke A1 to open. The liquid flows from the rear-side divided-chamber 29 to the front-side divided-chamber 28 through the main choke A1 and the movable sub-choke A2 within a rotation angle range of $\theta_1 + \theta_2$ so that a small hysteresis torque is developed.

Even when a small torsional fluctuation is produced due to the cycle-by-cycle variation of combustion, for example, under a state where the side plate body 3 is twisted at a specified angle relatively to the flange 3, the projection 27 will vibrate within the range of both the stoppers 25. Therefore, a small hysteresis torque can be maintained because the main choke A1 is opened.

Namely, a timing of change in the hysteresis torque is not determined by the torsion angle of the side plate body 3 relative to the flange 2, but a largeness of the hysteresis torque is determined by a positional relation of the movable slider 23 to the projection 27.

ANOTHER MODE FOR CARRYING OUT THE INVENTION (1) The embodiment shown above is applied to the damper which utilizes the coil spring for developing the twisting torque, however, it can also be applied to a damper which utilizes the liquid viscosity for developing the twisting torque too.

(2) The embodiment shown above can also be applied to a damper having a three-stage twisting characteristic.

EFFECT OF THE INVENTION

In the present invention as described above, the slider 23 is fitted onto the bottom edge of the notch 20 of the flange 2 in such the manner as slidable in the circumferential direction, the main choke A1 is formed between the slider 23 and the inward-facing projection 27 of the side plate body 3, the stoppers 25 able to mate with the projection 27 are formed on circumferential both ends of the slider 23 with a space left between them in a circumferential direction, and the movable choke A2 having a smaller flow sectional area than that of the main choke A1 is formed in the slider 23. Therefore, the hysteresis torque will be changed by the position of the projection 27 relative to the movable slider 23 regardless of the twisting angle of the side plate body 3 in relation to the flange 2. Consequently, when the operating angle is small such as in case of the cycle-by-cycle variation of combustion, a small viscous force is exerted and the hysteresis torque can be controlled to a minimum because the main choke A1 is opened.

On the other hand, in case of a large operating angle accompanied by the vibration of car body, the projection 27 contacts with the stopper 25 so that a large viscous force is exerted and the hysteresis torque becomes large because only the movable sub-choke A2 operates.

Accordingly, fluctuations such as the cycle-by-cycle variation and the vibration of car body can be absorbed effectively without any confrontation.

INDUSTRIAL APPLICABILITY

Since the fluctuations such as the cycle-by-cycle variation and the vibration of car body can be absorbed effectively without any confrontation, the damper of this invention is most suitable for damper discs for use in automobile clutches.

What is claimed is:

1. A fluid viscous damper in which a hub-side flange and a flywheel-side side plate body housing the foregoing flange by covering both sides and an outer peripheral end of the flange are installed, a damper mechanism for developing a torsional torque is installed in between the flange and the side plate body, a notch is formed on said outer peripheral end of the flange, liquid is filled in liquid chambers formed by the notch and inside faces of the side plate body, a projection protruding in the liquid chamber is formed on the inside face of the side plate body so as to partition the chamber into circumferential front and rear divided-chambers, and a main choke connecting the both divided-chambers is formed; characterized by that a slider is fitted onto a bottom edge of the notch in such a manner as slidable in a rotation direction, the main choke being formed between the slider and the projection, stoppers able to mate with the projection at circumferential both ends of the slider are formed with spaces left between them in the rotation direction, and a movable sub-choke having a flow sectional area smaller than that of the main choke is formed in the slider.

* * * * *